(12) United States Patent
Satoh (10) Patent No.: US 6,185,714 B1
(45) Date of Patent: Feb. 6, 2001

(54) ADDRESS TRAP COMPARATOR CAPABLE OF CARRYING OUT HIGH SPEED FAULT DETECTING TEST

(75) Inventor: Kazuaki Satoh, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/092,087

(22) Filed: Jun. 5, 1998

(30) Foreign Application Priority Data

Jun. 6, 1997 (JP) .................................................. 9-149734

(51) Int. Cl.⁷ .................................................. G01R 31/28
(52) U.S. Cl. ........................................... 714/736; 714/735
(58) Field of Search ........................... 324/500; 714/720, 714/733, 719, 773, 736, 735

(56) References Cited

U.S. PATENT DOCUMENTS

| | | | |
|---|---|---|---|
| 3,784,910 | * 1/1974 | Sylvan | 324/500 |
| 5,101,409 | * 3/1992 | Hack | 714/720 |
| 5,553,082 | * 9/1996 | Connor et al. | 714/733 |
| 5,963,566 | * 10/1999 | Rajsuman et al. | 714/733 |
| 5,996,097 | * 11/1999 | Evans et al. | 714/719 |

FOREIGN PATENT DOCUMENTS

| | | |
|---|---|---|
| 51-8842 | 1/1976 | (JP) . |
| 63-280342 | 11/1988 | (JP) . |
| 1-243133 | 9/1989 | (JP) . |
| 5-73342 | 3/1993 | (JP) . |
| 7-182200 | 7/1995 | (JP) . |
| 8-153018 | 6/1996 | (JP) . |

* cited by examiner

Primary Examiner—Albert De Cady
Assistant Examiner—David Ton
(74) Attorney, Agent, or Firm—Foley & Lardner

(57) ABSTRACT

In an N-bit address trap comparator, an N-bit address trap register stores an N-bit reference address, a bit-by-bit comparator compares an N-bit address with the N-bit reference address bit-by-bit, and an all-bit comparator detects whether or not all outputs of the bit-by-bit comparator have the same value. In a test mode the N-bit reference address is reset so that a first bit of the N-bit reference address is caused to be a first binary value and other bits are caused to be a second binary value. Also, the second binary value is set in all bits of the N-bit address, and then, the N-bit reference address is shifted within the N-bit address trap register.

6 Claims, 11 Drawing Sheets

"STUCK-AT-1" FAULT

Fig. 3B

"STUCK-AT-0" FAULT

Fig. 3C

"STUCK-AT-1" FAULT

ADDRESS TRAP COMPARATOR CAPABLE OF CARRYING OUT HIGH SPEED FAULT DETECTING TEST

BACKGROUND OF THE INVENTION

1. Field of the Invention

The present invention relates to an address trap comparator used in a computer system.

2. Description of the Related Art

Generally, in a computer system, a plurality of address trap comparators are provided, and the address trap comparators are controlled by a central processing unit (CPU). That is, when an address trap occurs in one of the address trap comparators, the CPU carries out an interrupt operation or the like in accordance with the address trap signal of the one of the address trap comparators.

A prior art address trap comparator is constructed by an address trap register for storing a reference address, a bit-by-bit comparator for comparing an address with the reference address stored in the address trap register on the bit-by-bit basis, and an all-bit comparator for detecting whether or not the outputs of the bit-by-bit comparator are the same. This will be explained later in detail.

In the above-mentioned prior art address trap comparator, a test mode is carried out to detect a fault such as a "stuck-at-1" fault or a "stuck-at-0" fault. Note that a "stuck-at-1" fault and a "stuck-at-0" fault will be explained later. For this purpose, special test patterns are supplied to the address trap comparator. This requires a large number of clock signal pulses, which increase the test time.

SUMMARY OF THE INVENTION

It is an object of the present invention to reduce the test time for detecting "stuck-at-1" and "stuck-at-0" faults in an address trap comparator.

According to the present invention, in an N-bit address trap comparator, an N-bit address trap register stores an N-bit reference address, a bit-by-bit comparator compares an N-bit address with the N-bit reference address bit-by-bit, and an all-bit comparator detects whether or not all outputs of the bit-by-bit comparator have the same value. In a test mode, the N-bit reference address is reset so that a first bit of the N-bit reference address is caused to be a first binary value and the other bits are caused to be a second binary value. Also, the second binary value is set in all bits of the N-bit address, and then, the N-bit reference address is shifted within the N-bit address trap register.

Thus, a test mode for "stuck-at-1" and "stuck-at-0" faults can be carried out without special test patterns.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, a prior art address trap comparator will be explained with reference to FIGS. 1 and 2.

Figure 1:
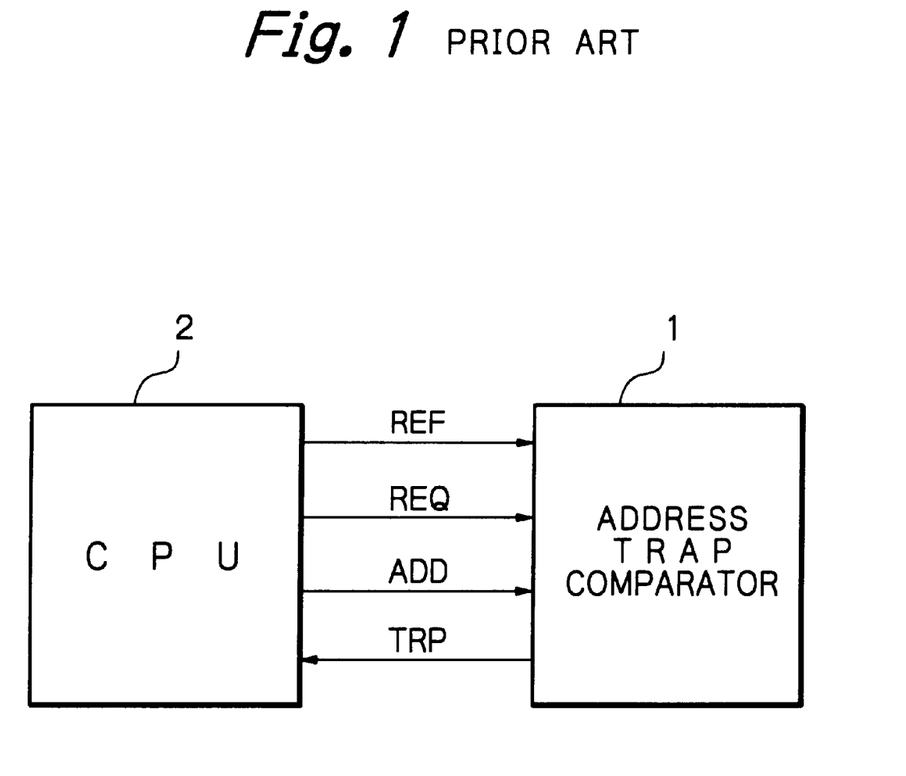
FIG. 1 is a block circuit diagram illustrating a computer system including a prior art address trap comparator.

In FIG. 1, which illustrates a computer system, a prior art address trap comparator 1 is connected to a CPU 2. Note that a plurality of address trap comparators are connected to the CPU 2, and when an address trap occurs in one of the address trap comparators, the CPU 2 carries out an interrupt operation of the like in accordance with the address trap signal of the one of the address trap comparators.

In FIG. 1, an address trap reference value REF is set in the address trap comparator 1. After the address trap comparator 1 receives and address trap request signal REQ from the CPU 2, the address trap comparator 1 compares an instruction/data address ADD from the CPU 2 with the address trap reference value REF. As a result, only when the instruction/data address ADD coincides with the address trap reference value REF, does the address trap comparator 1 generate an address trap signal TRP and transmit it to the CPU 2.

Figure 2:
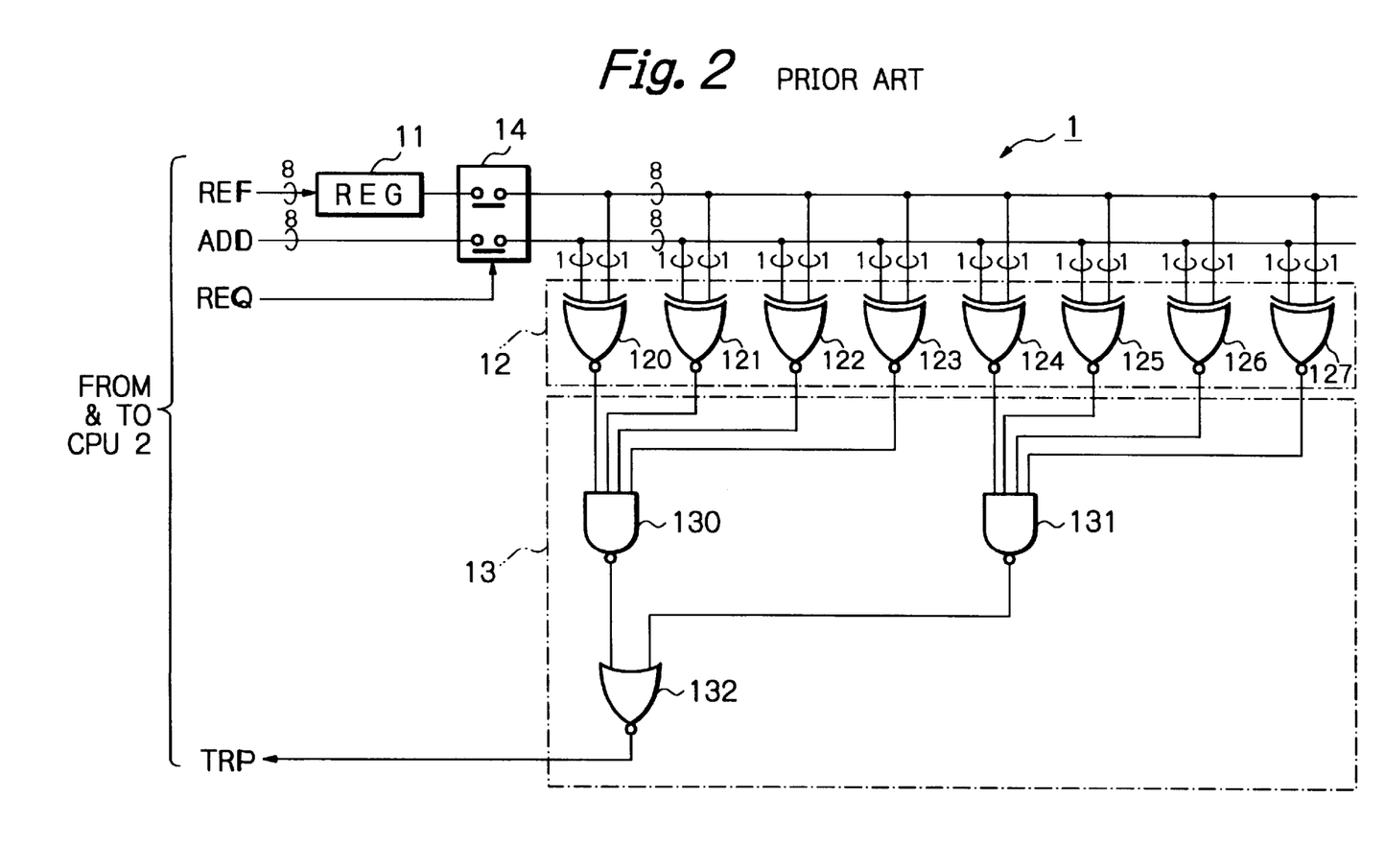
FIG. 2 is a detailed circuit diagram of the address trap comparator of FIG. 1.

In FIG. 2, which is a detailed circuit diagram of the address trap comparator 1 of FIG. 1, reference numeral 11 designates an address trap register for storing the address trap reference value REF, 12 designates a bit-by-bit comparator and 13 designates an all-bit comparator, i.e., an AND circuit. That is, the AND circuit 13 detects whether or not all the outputs of the exclusive NOR circuits 120 through 127 are "1". Also, a switch circuit 14 is activated by the address trap request signal REQ.

Here, assume that each of the address trap reference value REF and the address ADD consists of 8 bits, and the bit-by-bit comparator 12 is constructed by exclusive NOR circuits 120, 121, ..., 127. Also, the AND circuit 13 is constructed by two NAND circuits 130 and 131 and a NOR circuit 132.

In the address trap comparator 1 of FIG. 2, when the bits of the address ADD coincide with the respective bits of the address trap reference value REF, the outputs of the exclusive NOR circuits 120 through 127 are all high (="1"), so that the address trap signal TRP becomes high (="1"). On the other hand, when at least one of the bits of the address ADD does not coincide with the respective bit of the address trap reference value REF, at least one of the outputs of the exclusive NOR circuits 120, 121, ..., 127 is low (="0"), so that the address trap signal TRP becomes low (="0").

Figure 3A:
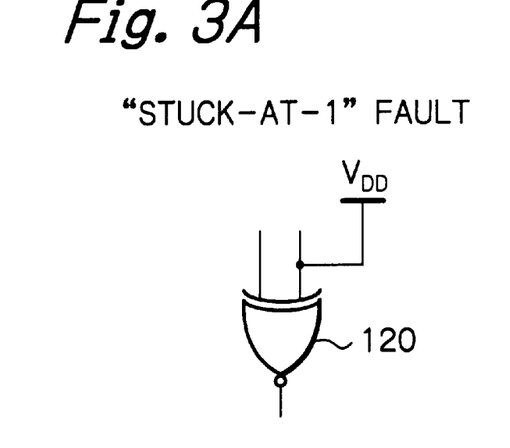
FIGS. 3A, 3B and 3C are circuit diagrams for explaining a "stuck-at-1" fault and a "stuck-at-0" fault in the address trap comparator of FIG. 2.
Figure 3B:
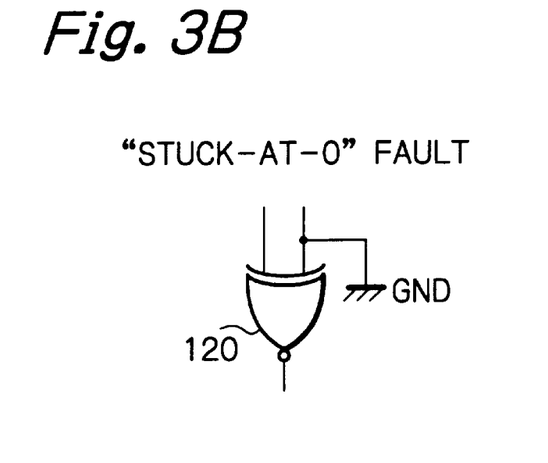

In FIG. 2, if the input of the exclusive NOR circuit such as 120 is short-circuited to a power supply line $V_{DD}$ as illustrated in FIG. 3A, this is called a "stuck-at-1" fault in the input of the exclusive NOR circuit. In order to detect such a "stuck-at-1" fault, the address trap reference value REF is caused to be "00 . . . 0" and the address ADD is caused to be "00 . . . 0". In this case, if there is such a "stuck-at-1" fault, at least one of the outputs of the exclusive NOR circuits 120 through 127 is "0", so that the address trap signal TRP becomes low (="0"), thus detecting the "stuck-at-1" fault. Similarly, if the input of the exclusive NOR circuit such as 120 is short-circuited to a ground line GND as illustrated in FIG. 3B, this is called a "stuck-at-0" fault in the input of the exclusive NOR circuit. In order to detect such a "stuck-at-0" fault, the address trap reference value REF is caused to be "11 . . . 1" and the address ADD is caused to be "11 . . . 1". IN this case, if there is such a "stuck-at-0" fault, at least one of the outputs of the exclusive NOR circuits 120 through 127 is also "0", so that the address trap signal TRP becomes low (="0"), thus detecting the "stuck-at-0" fault. According to these two test patterns, a "stuck-at-0" fault in the inputs of the NAND circuits 130 and 131, a "stuck-at-1" fault in the inputs of the NOR circuits 132 and a "stuck-at-0" fault in the output of the NOR circuit 132 can be detected.

Figure 3C:
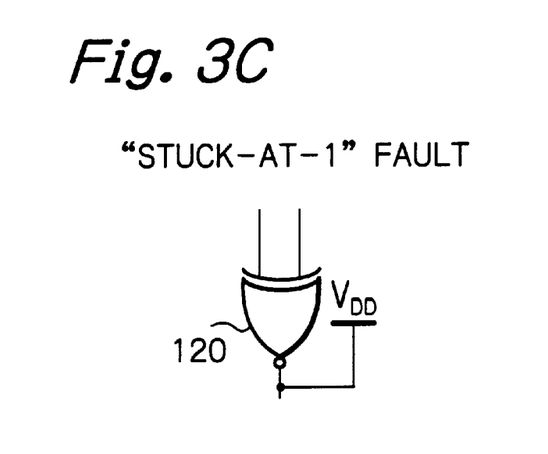

Additionally, if the output of the exclusive NOR circuit such as 120 is short-circuited to the power supply line $V_{DD}$ as illustrated in FIG. 3C, this is called a "stuck-at-1" fault in the output of the exclusive NOR circuit. In order to detect such a "stuck-at-1" fault, one bit of the address trap reference value REF is caused to be "0" and the corresponding one bit of the address ADD is "1" or vice versa to generate an output "0" in the output of the corresponding exclusive NOR circuit. That is, eight kinds of test patterns are required to detect a "stuck-at-1" fault in the outputs of the exclusive NOR circuits 120 through 127. According to these eight test patterns, a "stuck-at-0" fault in the input of the NOR circuit 132 can be detected.

In order to carry out a test mode for the "stuck-at-1" in the output of the exclusive NOR circuits 120 through 127, if the address ADD is a data address, the number of clock signal pulses is required as follows:

3×2 for storing the address trap reference value REF in the address trap register 11; and 8+2 ("mov" instruction) and 8+2 ("store/load" instruction) for setting the data address ADD.

That is, 26 clock signals are required for such a test mode where the address ADD is a data address.

In order to carry out a test mode for the "stuck-at-1" in the outputs of the exclusive NOR circuits 120 through 127, if the address ADD is an instruction address, the number of clock signal pulses required is as follows:

3×2 for storing the address trap reference value REF in the address trap register 11;

8+2 ("mov" instruction), 2×10 ("transfer"), and 3×10 ("jump") for setting the instruction address ADD.

That is, 66 clock signal pulses are required for such a test mode where the address ADD is an instruction address.

Figure 4:
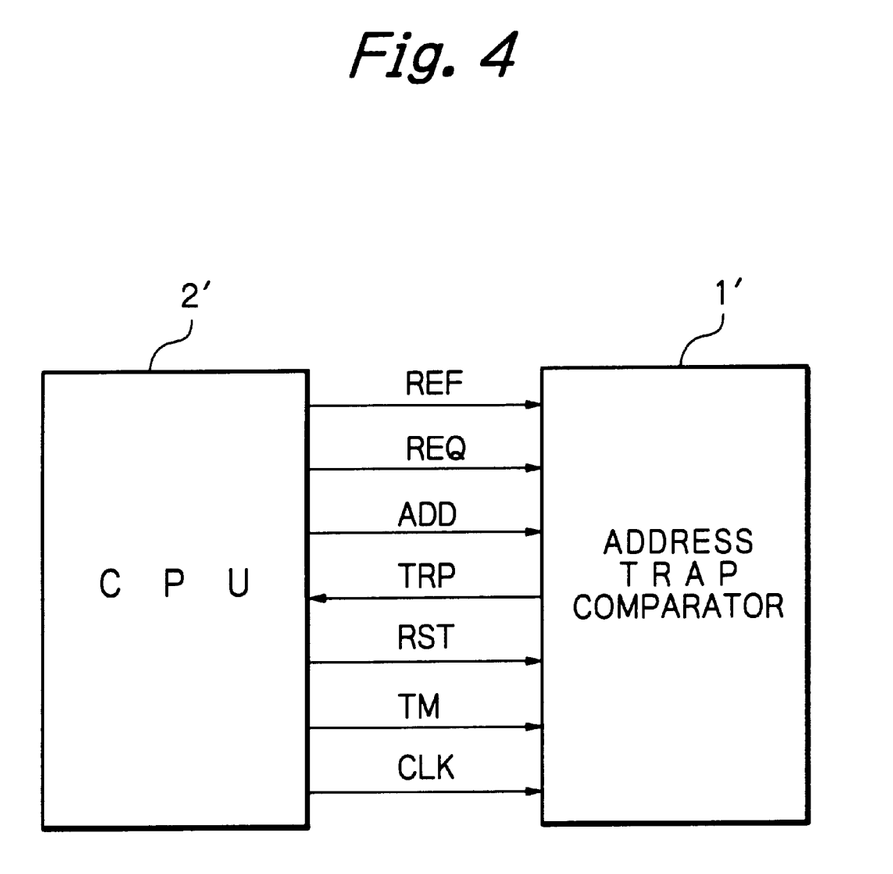
FIG. 4 is a block circuit diagram illustrating a computer system including a first embodiment of the address trap comparator according to the present invention.

In FIG. 4, which illustrates a computer system, a first embodiment of the address trap comparator 1' according to the present invention is connected to a CPU 2'. The CPU 2' generates a reset signal RST, a test mode signal TM and a clock signal CLK to carry out a test mode for a "stuck-at-1" fault in the output of the exclusive NOR circuits as well as a "stuck-at-0" fault in the inputs of the exclusive NOR circuits.

Figure 5:
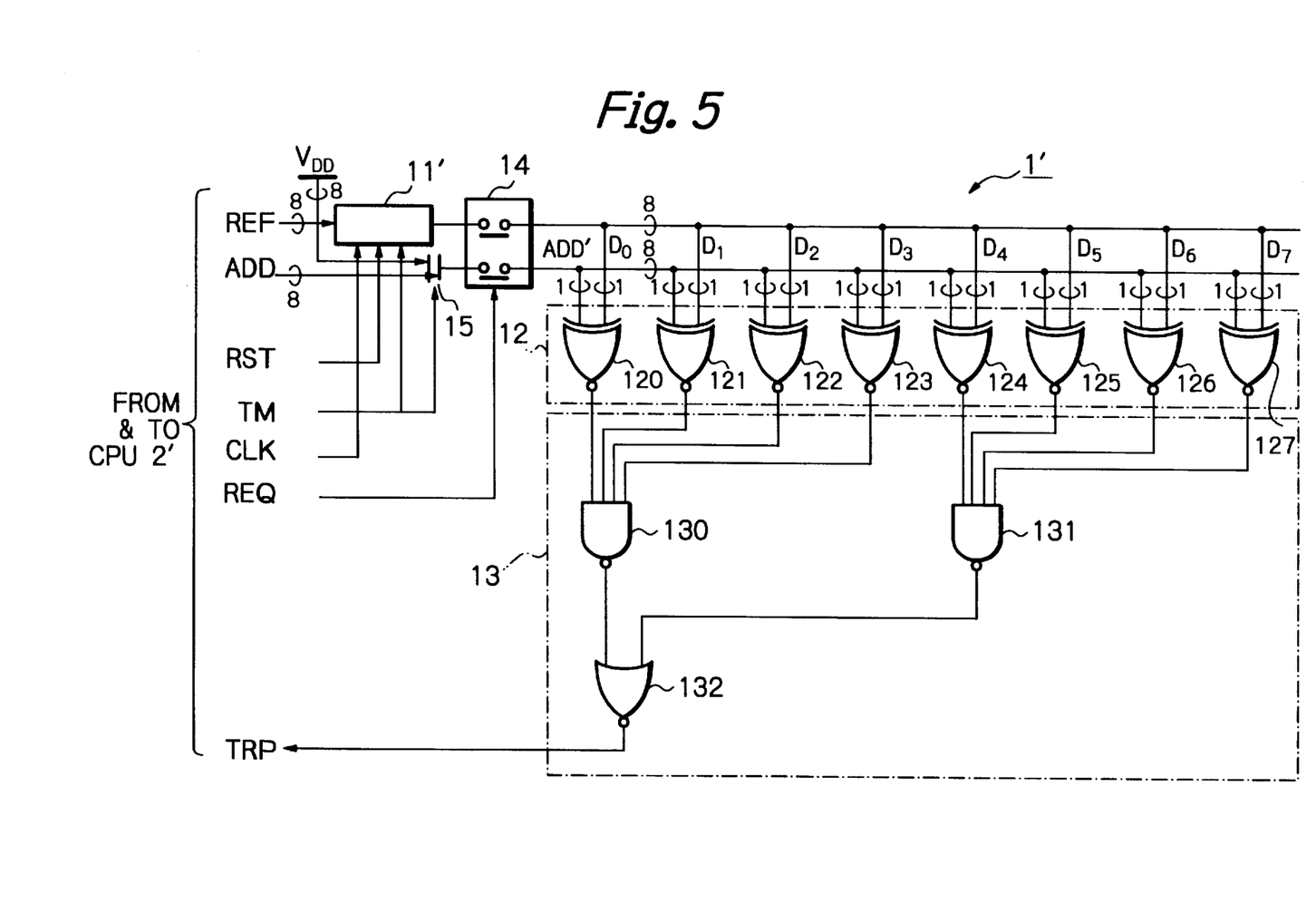
FIG. 5 is a detailed circuit diagram of the address trap comparator of FIG. 4.

In FIG. 5, which is a detailed circuit diagram of the address trap comparator 1' of FIG. 4, the address trap register 11 of FIG. 2 is replaced by an address trap register 11', and selector circuit 15 is provided for replacing the address ADD with all "1" data in a test mode.

Figure 6:
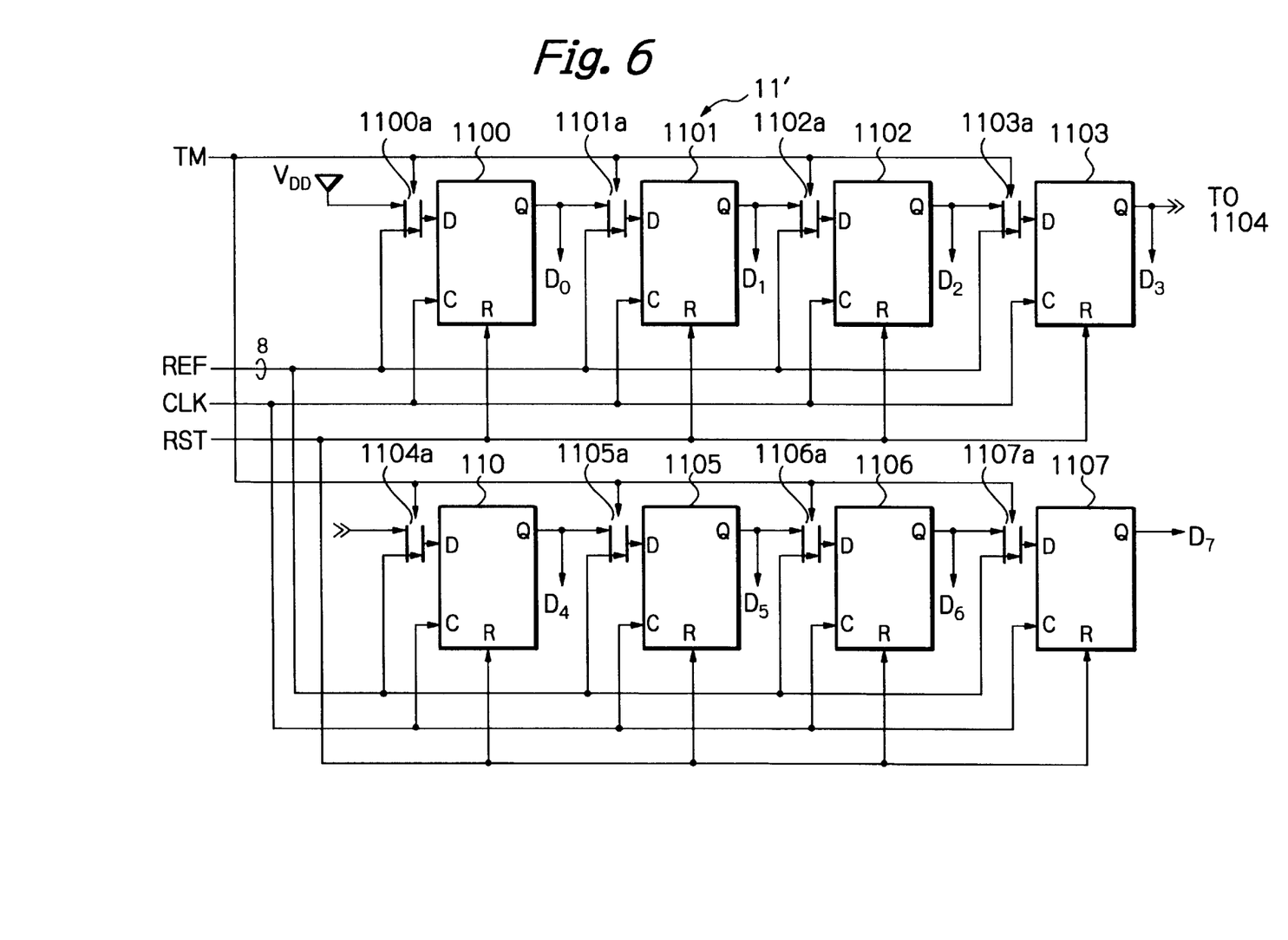
FIG. 6 is a detailed circuit diagram of the address trap register of FIG. 5.

In FIG. 6, which is a detailed circuit diagram of the address trap register 11' of FIG. 5, latch circuits 1100 through 1107 associated with selector circuits 1100a through 1107a are provided. The latch circuits 1100 through 1107 generate data $D_0$ through $D_7$, respectively.

In a usual mode where the test mode signal TM is "0", the selector circuits 1100a through 1107a are operated to select the address trap reference value REF. Therefore, the address trap reference value REF is stored in the latch circuits 1100 through 1107.

In a test mode, when a reset signal RST is generated, all the latch circuits 1100 through 1107 are reset. In this case, the reset value of the latch circuit 1100 is "0", while the reset values of the latch circuits 1101 through 1107 are "1". That is, $D_0, D_1, D_2, D_3, D_4, D_5, D_6, D_7$=(0, 1, 1, 1, 1, 1, 1, 1)

Note that the reset values of the latch circuits 1100 through 1107 can be easily adjusted.

Additionally, the test mode signal TM is caused to be a "1", so that the selector circuits 1100a through 1107a are operated to connect the latch circuits 1100 through 1107 in series. That is, the latch circuits 1100 through 1107 serve as a shift register. In this case, "1" (=$V_{DD}$) is supplied to the latch circuit 1100.

Further, in the test mode, the clock signal CLK is supplied to the latch circuits 1100 through 1107. As a result, the output data ($D_0, D_1, \ldots, D_7$) of the latch circuits 1100 through 1107 is changed by receiving each pulse of the clock signal CLK:

(0, 1, 1, 1, 1, 1, 1, 1)
→(1, 0, 1, 1, 1, 1, 1, 1)
→(1, 1, 0, 1, 1, 1, 1, 1)
→(1, 1, 1, 0, 1, 1, 1, 1)
→(1, 1, 1, 1, 0, 1, 1, 1)
→(1, 1, 1, 1, 1, 0, 1, 1)
→(1, 1, 1, 1, 1, 1, 0, 1)
→(1, 1, 1, 1, 1, 1, 1, 0)
→(1, 1, 1, 1, 1, 1, 1, 1)

The operation of the address trap comparator 1' of FIG. 5 is explained next.

In a usual mode, an address trap reference value REF is stored in the address trap register 11' in advance. Then, after the switch circuit 14 is activated by the address trap request signal REQ, an instruction address or a store/load data address ADD is supplied via the selector circuit 15 and the switch circuit 14 to the bit-by-bit comparator 12 which also receives the output data ($D_0, D_1, \ldots, D_7$) of the address trap register 11'. As a result, when the bits of the address ADD coincide with the output data $D_0, D_1, \ldots, D_7$ of the address trap register 11', the outputs of the exclusive NOR circuits 120 through 127 are all high (="1"), so that the address trap signal TRP becomes high (="1"). On the other hand, when at least one of the bits of the address ADD does not coincide with the output data $D_0, D_1, \ldots, D_7$ of the address trap register 11', at lest one of the outputs of the exclusive NOR circuits 120, 121, . . . , 127 is low (="0"), so that the address trap signal TRP becomes low (="0").

In a test mode, a reset signal RST is generated, so that all the latch circuits 1100 through 1107 are reset. In this case, $$(D_0, D_1, D_3, D_4, D_5, D_6, D_7) = (0, 1, 1, 1, 1, 1, 1)$$

Then, after the switch circuit 14 is activated by the address trap request signal REQ, the test mode signal TM is caused to be "1". As a result, the bits of an 8-bit address ADD' are fixed by the selector circuit 15 at "1". That is, $$ADD' = (1, 1, 1, 1, 1, 1, 1, 1)$$

In this state, the exclusive NOR circuit 120 is expected to compare with "1" with "0", while the other exclusive NOR circuits 121 through 127 are expected to compare "1" with "1". If the exclusive NOR circuit 120 has a "stuck-at-1" fault in the output thereof, the address trap signal TRP becomes "1", which shows such a "stuck-at1" fault.

Next, one pulse of the clock signal CLK is generated. As a result, $$(D_0, D_1, D_2, D_3, D_4, D_5, D_6, D_7) = (1, 0, 1, 1, 1, 1, 1, 1)$$

In this state, the exclusive NOR circuit 121 is expected to compare "1" with "0", while the other exclusive NOR circuits are expected to compare "1" with "1". If the exclusive NOR circuit 121 has a "stuck-at-1" fault in the output thereof, the address trap signal TRP becomes "1", which shows such a "stuck-at-1" fault.

Next, one pulse of the clock signal CLK is generated. As result,
$$(D_0, D_1, D_2, D_3, D_4, D_5, D_6, D_7) = (1, 1, 0, 1, 1, 1, 1, 1)$$

In this state, the exclusive NOR circuit 122 is expected to compare "1" with "0", while the other exclusive NOR circuits are expected to compare "1" with "1". If the exclusive NOR circuit 122 has a "stuck-at-1" fault in the output thereof, the address trap signal TRP becomes "1", which shows such a "stuck-at-1" fault.

Next, one pulse of the clock signal CLK is generated. As a result, $$(D_0, D_1, D_2, D_3, D_4, D_5, D_6, D_7) = (1, 1, 1, 0, 1, 1, 1, 1)$$

In this state, the exclusive NOR circuit 123 is expected to compare "1" with "0", while the other exclusive NOR circuits are expected to compare "1" with "1". If the exclusive NOR circuit 123 has a "stuck-at-1" fault in the output thereof, the address trap signal TRP becomes "1", which shows such a "stuck-at-1" fault.

Next, one pulse of the clock signal CLK is generated. As a result, $$(D_0, D_1, D_2, D_3, D_4, D_5, D_6, D_7) = (1, 1, 1, 1, 0, 1, 1, 1)$$

In this state, the exclusive NOR circuit 124 is expected to compare "1" with "0", while the other exclusive NOR circuits are expected to compare "1" with "1". If the exclusive NOR circuit 124 has a "stuck-at-1" fault in the output thereof, the address trap signal TRP becomes "1", which shows such a "stuck-at-1" fault.

Next, one pulse of the clock signal CLK is generated. As a result, $$(D_0, D_1, D_2, D_3, D_4, D_5, D_6, D_7) = (1, 1, 1, 1, 1, 0, 1, 1)$$

In this state, the exclusive NOR circuit 125 is expected to compare "1" with "0", while the other exclusive NOR circuits are expected to compare "1" with "1". If the exclusive NOR circuit 125 has a "stuck-at1" fault in the output thereof, the address trap signal TRP becomes "1", which shows such a "stuck-at-1" fault.

Next, one pulse of the clock signal CLK is generated. As a result, $$(D_0, D_1, D_2, D_3, D_4, D_5, D_6, D_7) = (1, 1, 1, 1, 1, 1, 0, 1)$$

In this state, the exclusive NOR circuit 126 is expected to compare "1" with "0", while the other exclusive NOR circuits are expected to compare "1" with "1". If the exclusive NOR circuit 126 has a "stuck-at-1" fault in the output thereof, the address trap signal TRP becomes "1", which shows such a "stuck-at-1" fault.

Next, one pulse of the clock signal CLK is generated. As a result, $$(D_0, D_1, D_2, D_3, D_4, D_5, D_6, D_7) = (1, 1, 1, 1, 1, 1, 1, 0)$$

In this state, the exclusive NOR circuit 127 is expected to compare "1" with "0", while the other exclusive NOR circuits are expected to compare "1" with "1". If the exclusive NOR circuit 127 has a "stuck-at-1" fault in the output thereof, the address trap signal TRP becomes "a", which shows such a "stuck-at-1" fault.

Finally, one pulse of the clock signal CLK is generated. As a result, $$(D_0, D_1, D_2, D_3, D_4, D_5, D_6, D_7) = (1, 1, 1, 1, 1, 1, 1, 1)$$

In this state, all the exclusive NOR circuits 120 through 127 are expected to compare "1" with "1". If one of the exclusive NOR circuits has a "stuck-at-0" fault in the input thereof, the address trap signal TRP becomes "0", which shows such a "stuck-at-0"fault.

Note that a test mode for a "stuck-at-1" fault in the inputs of the exclusive NOR circuits 120 through 127 can be carried out in the same way as in the prior art address trap comparator 1' of FIG. 2. That is, (0, 0, . . . , 0) is stored in the address trap register 11' by using the address trap reference value REF, and an address ADD (0, 0, . . . , 0) is supplied as the address ADD'. As a result, if one of the exclusive NOR circuits has a "stuck-at-1" fault in the inputs thereof the address trap signal TRP becomes "0", which shows such a "stuck-at-1" fault.

In the first embodiment, in order to carry out a test mode for the "stuck-at-1" in the output of the exclusive NOR circuits 120 through 127, if the address ADD is a data address, the number of clock signal pulses required is as follows:

3 for resetting the address trap register 11'; and 3 ("store/load" instruction) for setting the data address ADD (all "1").

That is, only 4 clock signal pulses are required for such a test mode where the address ADD is a data address.

In the first embodiment, in order to carry out a test mode for the "stuck-at1" in the outputs of the exclusive NOR circuits 120 through 127, if the address ADD is an instruction address, the number of clock signal pulses requires is as follows:

3 for resetting the address trap register 11'; and 1 ("mov" instruction), 2 ("transfer"), and 3 ("jump") for setting the instruction address ADD.

That is, only 9 clock signal pulses are required for such a test mode where the address ADD is an instruction address.

Figure 7:
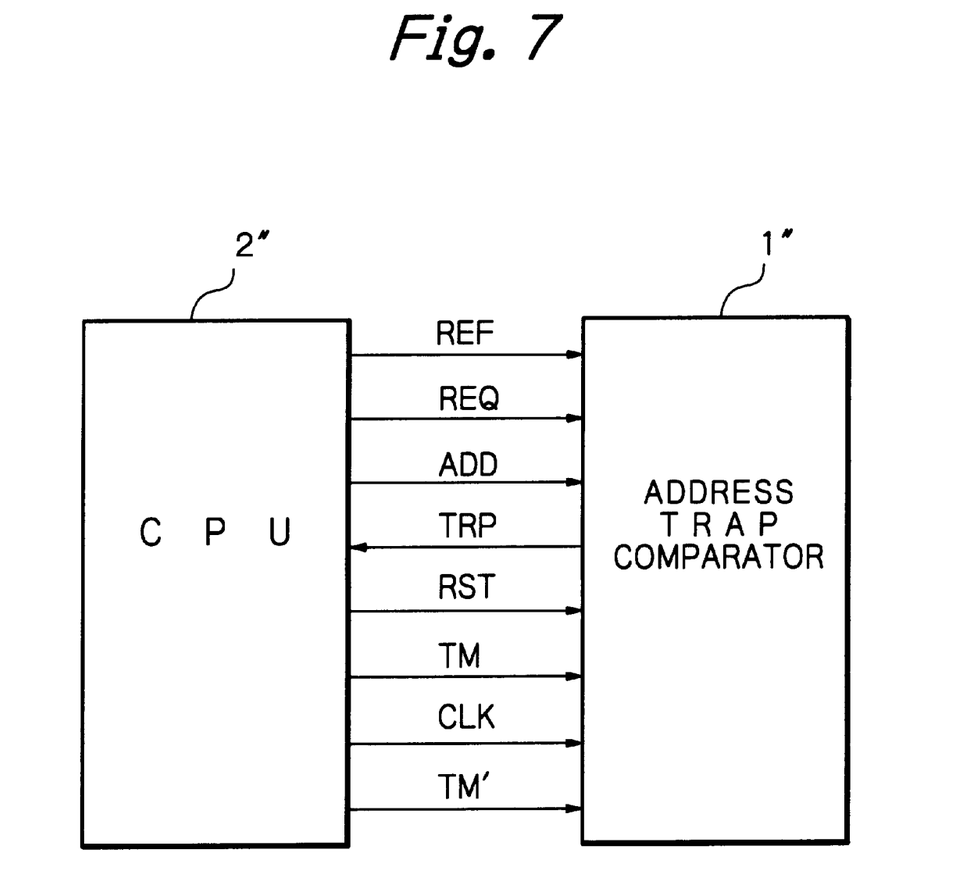
FIG. 7 is a block circuit diagram illustrating a computer system including a second embodiment of the address trap comparator according to the present invention.

In FIG. 7, which illustrates a computer system, a second embodiment of the address trap comparator 1" according to the present invention is connected to a CPU 1". The CPU 2" generates an additional test mode signal TM' to carry out a test mode for a "stuck-at-1" fault in the inputs of the exclusive NOR circuits.

Figure 8:
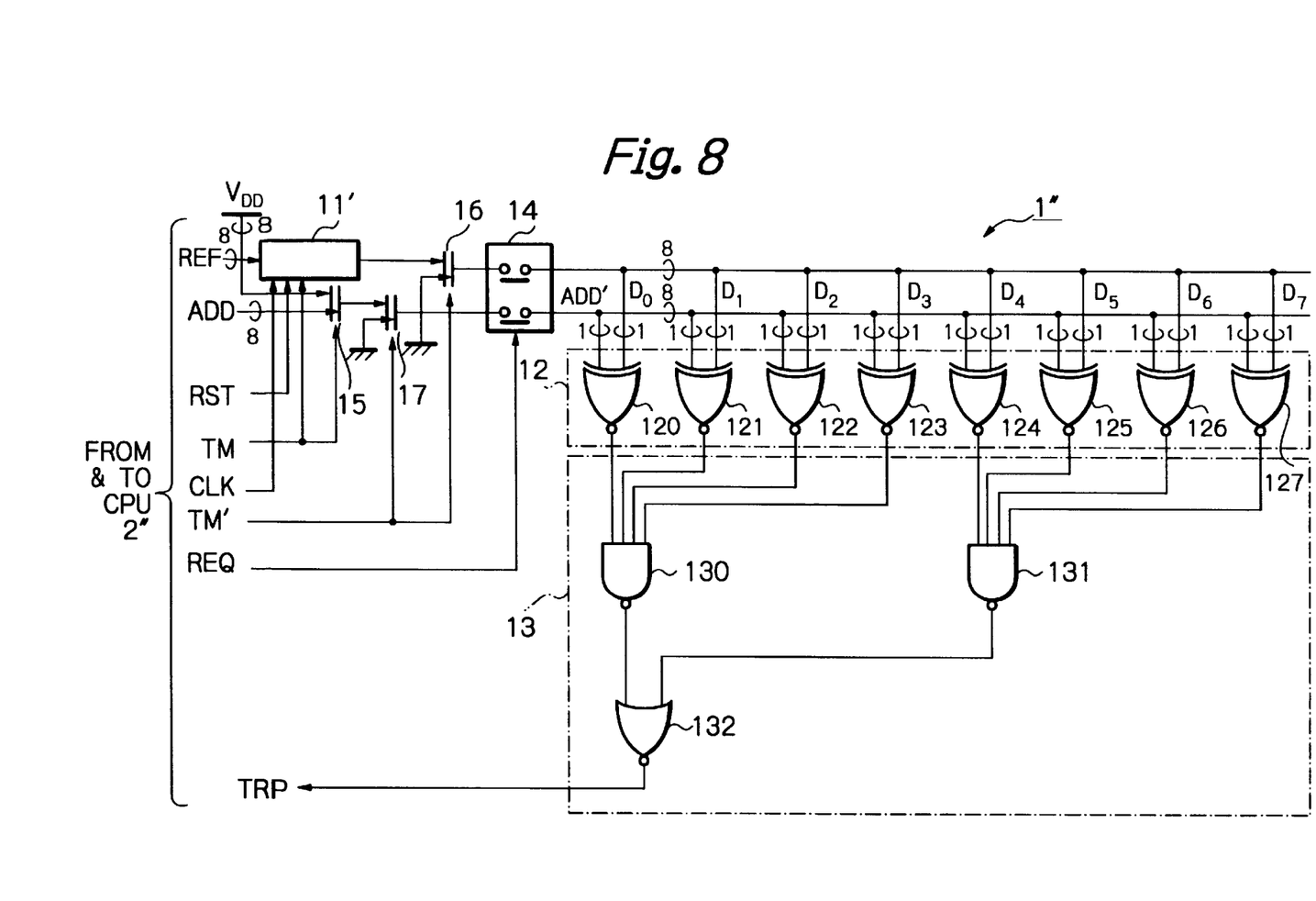
FIG. 8 is a detailed circuit diagram of the address trap comparator of FIG. 7.

In FIG. 8, which is a detailed circuit diagram of the address trap comparator 1" of FIG. 7, selector circuits 16 and 17 controlled by the test mode signal TM' are added to the elements of FIG. 5.

In FIG. 8, if the test mode signal TM' is low (="0"), the selector circuit 16 connects the address trap register 11' to the switch circuit 14, and the selector circuit 17 connects the selector circuit 15 to the switch circuit 14. Thus, the address trap comparator 1" operates in the same way as the address trap comparator 1' of FIG. 5.

On the other hand, in FIG. 8, if the test mode signal TM' is high (="1"), the ground voltage is supplied to the switch circuit 14. That is, when the switch circuit 14 is activated by the address trap request signal REQ, the data $D_0 D_1, \ldots, D_7$ of the latch circuits 120, 121, . . . , 127 is $$(D_0, D_1, D_2, D_{3[<m]ditL}, D_4, D_5, D_6, D_7) = (0, 0, 0, 0, 0, 0, 0, 0)$$

Also, the address signal ADD' is (0, 0, 0, 0, 0, 0, 0, 0). Therefore, all the exclusive NOR circuits 120 through 127 are expected to compare "0" with "0". If one of the exclusive NOR circuits has a "stuck-at-1" fault in the input thereof, the address trap signal TRP becomes "0", which shows such a "stuck-at1" fault.

Thus, in the second embodiment, a complete test for "stuck-at0" and "stuck-at1" faults can be carried out without supplying test patterns to the address trap comparator 1". Thus, the number of clock signals can be further reduced.

Figure 9:
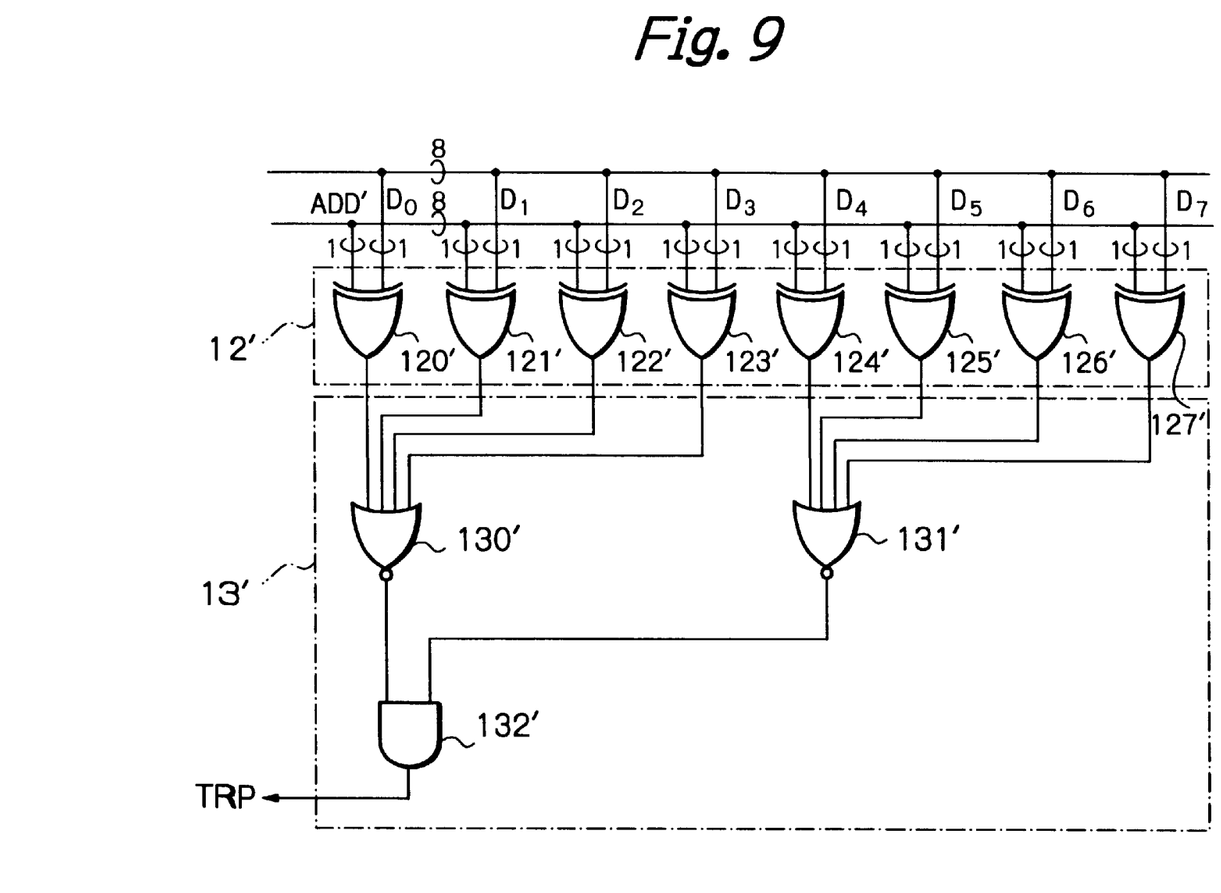
FIG. 9 is a circuit diagram illustrating modifications of the bit-by-bit comparator and the all-bit comparator of FIGS. 5 and 8.

The bit-by-bit comparator 12 of FIGS. 5 and 8 can be modified to a bit-by-bit comparator 12' constructed by exclusive OR circuits 120' through 127' as illustrated in FIG. 9. In this case, the AND circuit 13 of FIGS. 5 and 8 is modified to a NOR circuit 13' constructed by NOR circuits 130' and 131' and an AND circuit 132'. That is, the NOR circuit 13' detects whether or not all the outputs of the exclusive OR circuits 120' through 127' are "0".

Figure 10:
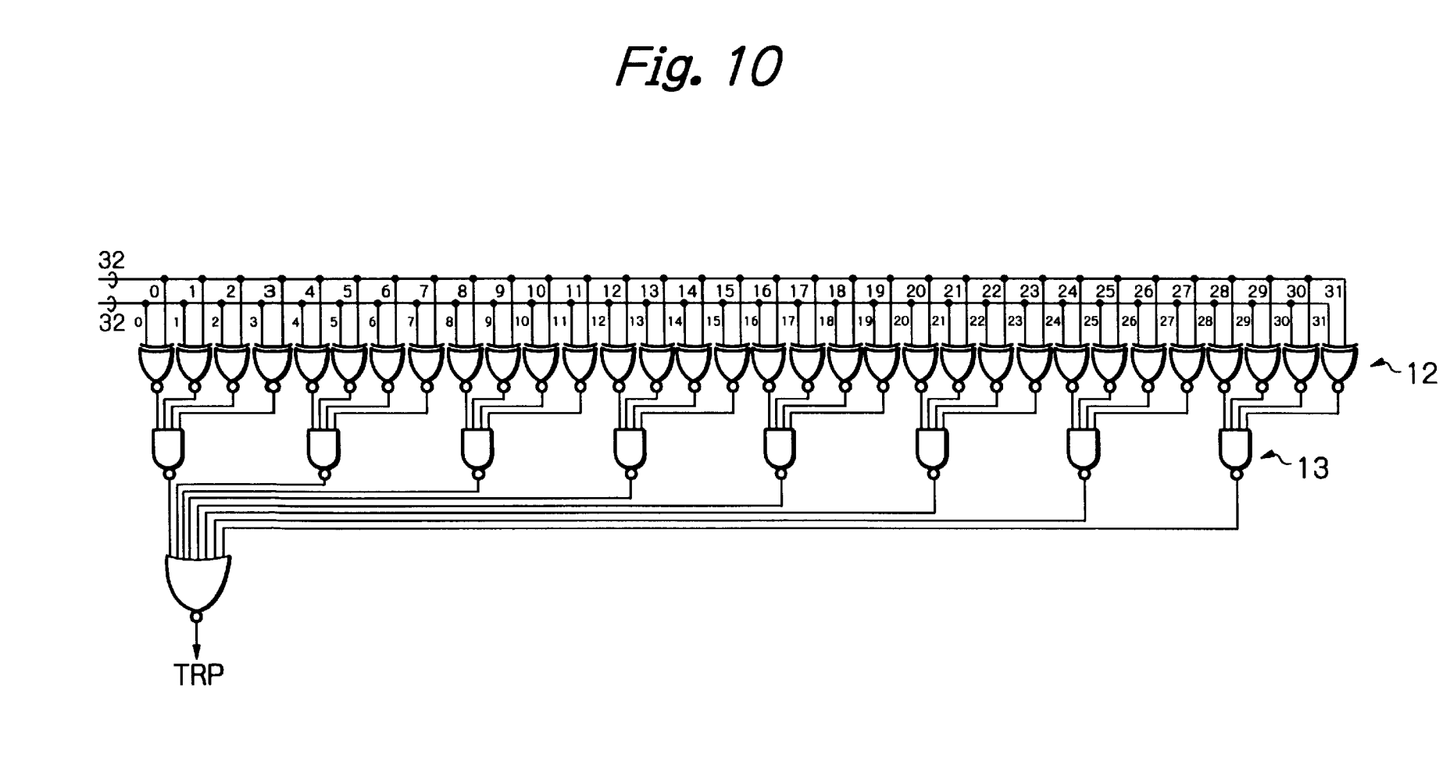
FIG. 10 is a circuit diagram of another modification of the bit-by-bit comparator and the all-bit comparator of FIGS. 5 and 8.
Figure 11:
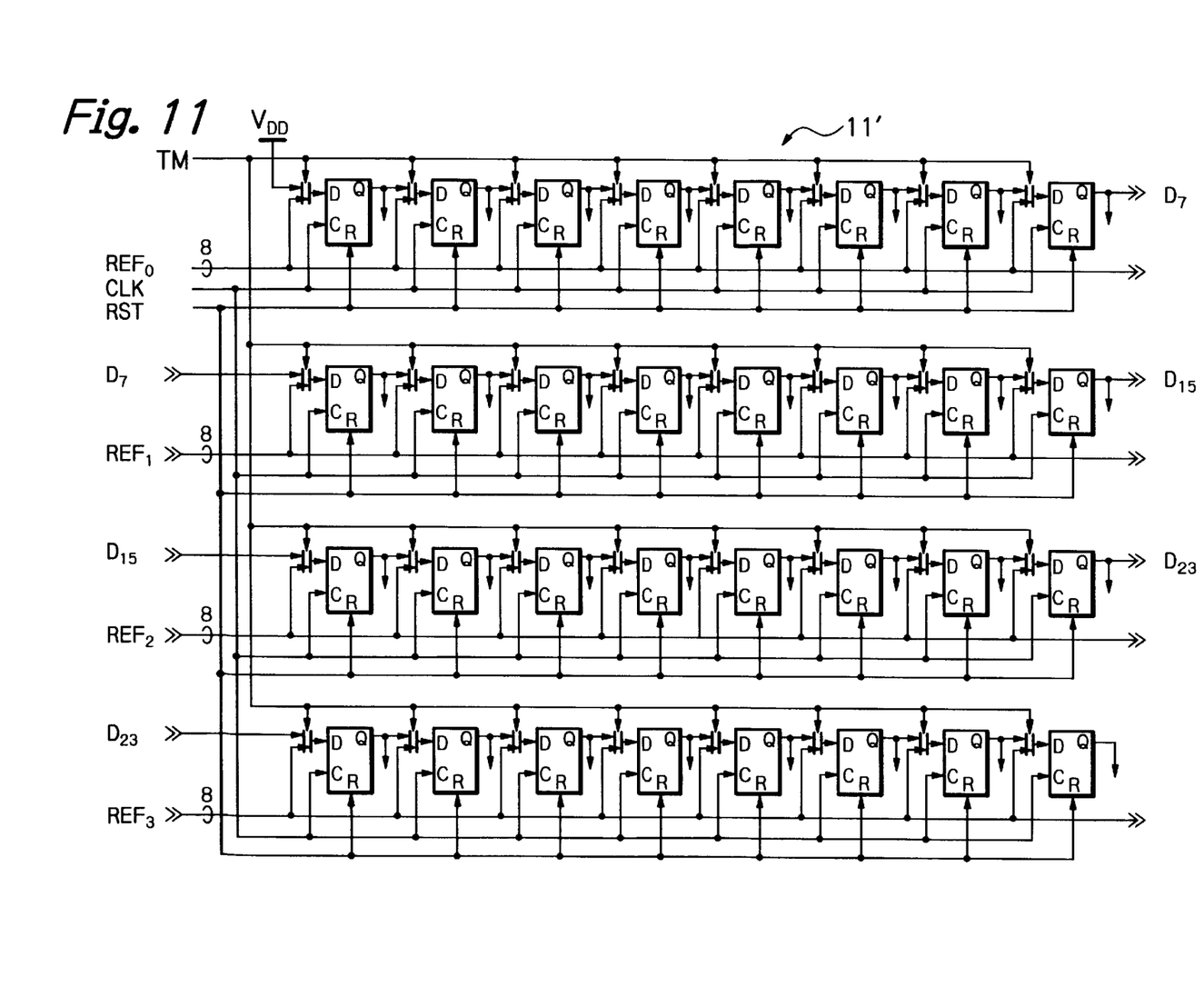
FIG. 11 is a circuit diagram of a modification of the address trap register of FIGS. 5 and 8.

Also, the address trap comparators 1' and 1" can be easily extended to other bit-types than an 8-bit type. For example, if the address trap comparators 1' and 1" are of a 32-bit type, the bit-by-bit comparator 12 and the AND circuit 13 are illustrated in FIG. 10, and the address trap register 11' is illustrated in FIG. 11.

As explained hereinabove, according to the present invention, since the number of clock signal faults is remarkably reduced, the test time can be remarkably reduced.

What is claimed is:

1. An N-bit address trap comparator comprising:

N-bit reference lines;

N-bit address lines;

an N-bit address trap register, operatively connected to said N-bit reference lines, for receiving an N-bit reference address;

an N-bit selector circuit, operatively connected to said N-bit address lines, for selecting one of an N-bit address and N-bit first binary data and transmitting it to said N-bit address lines;

a bit-by-bit comparator including N-bit comparator elements each connected to one of said N-bit reference lines and one of said N-bit address lines; and an all-bit comparator, connected to said N-bit comparator elements, for detecting whether or not all outputs of said N-bit comparator elements have the same value;

a first test means for resetting said N-bit address trap register so that a first bit of said N-bit reference address is caused to be a second binary value and other bits of said N-bit reference address than said first bit are caused to be said first binary value, operating said selector circuit to select said N-bit first binary data, and shifting said N-bit reference address within said N-bit address trap register; and a second test means connected to said N-bit reference lines and said N-bit address lines, for supplying said second binary value to all lines of said N-bit reference lines and said N-bit address lines.

2. The N-bit address trap comparator as set forth in claim 1, wherein each of said comparator elements comprises an exclusive NOR circuit, said all-bit comparator comprising an AND circuit.

3. The N-bit address trap comparator as set forth in claim 1, wherein each of said comparator elements comprises an exclusive OR circuit, said all-bit comparator comprising a NOR circuit.

4. An N-bit address trap comparator comprising:

an N-bit address trap register for storing an N-bit reference address, said N-bit address trap register being reset by receiving a test signal so that a first bit of said N-bit reference address is caused to be a first binary value and other bits of said N-bit reference address than said first bit are caused to be a second binary value, said N-bit address trap register serving as a shift register by receiving a first test mode signal, said shift register being operated by receiving a clock signal;

a first selector circuit for selecting one of an N-bit address and N-bit second binary data;

N-bit reference lines each operatively connected to one output bit of said N-bit address trap register;

N-bit address lines each operatively connected to one output bit of said first selector circuit;

N-bit first comparators, each connected to one of said N-bit reference lines and one of said N-bit address lines;

a second comparator connected to said N-bit first comparators;

a second selector circuit, connected between said address trap register and said N-bit reference lines, for supplying said first binary value to said N-bit reference lines by receiving a second test mode signal; and a third selector circuit, connected between said first selector circuit and said N-bit address lines, for supplying said first binary value to said N-bit address lines by receiving said second test mode signal.

5. The N-bit address trap comparator as set forth in claim 4, wherein each of said N-bit first comparators comprises an exclusive NOR circuit, said second comparator comprising an AND circuit.

6. The N-bit address trap comparator as set forth in claim 4, wherein each of said N-bit first comparators comprises an exclusive OR circuit, said second comparator comprising a NOR circuit.

* * * * *